(12) United States Patent
Salfer

(10) Patent No.: US 11,716,165 B2
(45) Date of Patent: Aug. 1, 2023

(54) METHODS AND DEVICES FOR THE CONCEALMENT OF RADIO IDENTIFIERS AND TRANSMITTER POSITIONS

(71) Applicant: Bayerische Motoren Werke Aktiengesellschaft, Munich (DE)

(72) Inventor: Martin Salfer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 287 days.

(21) Appl. No.: 16/981,672

(22) PCT Filed: Apr. 18, 2019

(86) PCT No.: PCT/EP2019/060099
§ 371 (c)(1),
(2) Date: Sep. 16, 2020

(87) PCT Pub. No.: WO2019/206810
PCT Pub. Date: Oct. 31, 2019

(65) Prior Publication Data
US 2021/0099245 A1   Apr. 1, 2021

(30) Foreign Application Priority Data
Apr. 26, 2018   (DE) .................... 10 2018 206 476.8

(51) Int. Cl.
*G06F 21/62* (2013.01)
*H04L 61/2521* (2022.01)
(Continued)

(52) U.S. Cl.
CPC ......... *H04K 1/003* (2013.01); *G06F 21/6254* (2013.01); *H04L 61/2525* (2013.01);
(Continued)

(58) Field of Classification Search
CPC . H04K 1/003; G06F 21/6254; H04L 61/2525; H04L 61/2539; H04L 63/0414;
(Continued)

(56) References Cited

U.S. PATENT DOCUMENTS 6,621,767 B1 * 9/2003 Kattan .................... G04F 10/00
702/176
2003/0105964 A1    6/2003 Brainard et al.
(Continued)

FOREIGN PATENT DOCUMENTS

| DE | 10 2015 204 210 A1 | 9/2016 |
|----|---|---|
| EP | 2 987 371 B1 | 2/2016 |

OTHER PUBLICATIONS

PCT/EP2019/060099, International Search Report dated Jun. 19, 2019 (Two (2) pages).
(Continued)

*Primary Examiner* — Mohammed Waliullah
(74) *Attorney, Agent, or Firm* — Crowell & Moring LLP

(57) ABSTRACT

Systems, devices and methods for concealing radio communications and the spatial position of radio transmitters involved therein include the use of electrotechnical signal variation and dynamic, pseudo-random radio identifier. Transmitted radio signals contain radio identifiers identifying the transmitting mobile radio device. Each radio identifier is dynamically selected for each radio signal from a sequence of radio identifiers selected from a set of pre-defined pseudo-random sequences. The sequence is selected based on a predetermined selection rule. The radio identifier is selected from the thus selected sequence according to a predetermined deterministic update pattern associated with the selected sequence. The associated transmission power (Continued)

and/or transmission frequency is dynamically varied on the transmitter side according to a predetermined deterministic variation scheme.

17 Claims, 8 Drawing Sheets

(51) Int. Cl.

| | |
|---|---|
| *H04L 61/2539* | (2022.01) |
| *H04L 9/40* | (2022.01) |
| *H04W 12/02* | (2009.01) |
| *H04K 1/00* | (2006.01) |
| *H04L 67/12* | (2022.01) |
| *H04W 52/14* | (2009.01) |

(52) U.S. Cl.
CPC ...... *H04L 61/2539* (2013.01); *H04L 63/0414* (2013.01); *H04L 67/12* (2013.01); *H04W 12/02* (2013.01); *H04W 52/146* (2013.01)

(58) Field of Classification Search
CPC ........ H04L 67/12; H04L 63/08; H04W 12/02; H04W 52/146; H04W 12/06; Y04S 40/18; Y04S 40/20
See application file for complete search history.

(56) References Cited

U.S. PATENT DOCUMENTS

| | | |
|---|---|---|
| 2014/0006787 A1 | 1/2014 | Measson et al. |
| 2015/0038074 A1 | 2/2015 | Buckley et al. |
| 2016/0286388 A1 | 9/2016 | Marin et al. |
| 2017/0070847 A1 | 3/2017 | Altman et al. |

OTHER PUBLICATIONS

German Search Report issued in German application No. 10 2018 206 476.8 dated Apr. 9, 2019, with Statement of Relevancy (Sixteen (16) pages).

Lei, M. et al., "Protecting Location Privacy with Dynamic MAC Address Exchanging in Wireless Networks; Intelligence and Security Informatics" 2007 IEEE (One (1) page).

* cited by examiner

METHODS AND DEVICES FOR THE CONCEALMENT OF RADIO IDENTIFIERS AND TRANSMITTER POSITIONS

BACKGROUND AND SUMMARY OF THE INVENTION

The present invention relates generally to the concealment of radio communication, and of the spatial position of a radio transmitter, e.g., a mobile transmitter, involved therein, by means of electrical signal variation and dynamic, pseudorandom radio identifiers. In particular, the invention relates to methods for transmitting radio identifiers and for identifying, at the receiver, a mobile radio apparatus on the basis of the radio identifiers. The invention also relates to a mobile radio apparatus and a system for carrying out such methods. The invention also relates to a vehicle, e.g., a motor vehicle, having such a mobile radio apparatus.

A large number of different technologies and protocols are available today for wireless communication between two or more subscribers. These include radio technologies for short-range communication over various distances, from a few centimeters to a few hundred meters. These technologies include WLAN (standardized as IEEE 802.11), Bluetooth (standardized by the Bluetooth Special Interest Group and IEEE 802.15.1) and "LTE Direct" mobile radio technology, standardized by 3GPP (Release 12 onward). The subscribers involved in wireless communication of this kind can be mobile terminals, such as for example, mobile phones, smartphones, portable computers (e.g., tablet computers or notebooks), radio interface equipped sensors, and any other devices (e.g., traffic lights, etc.) connected wirelessly in accordance with what is known as the "Internet of Things," or "IOT."

It is customary for the subscribers to use a static subscriber or network address or other radio identifier by means of which they are detectable and/or addressable by other subscribers, in this context, "static" means that this address or radio identifier does not change over time and hence is firmly linked to a subscriber device. Examples of static addresses or radio identifiers of this kind are Media Access Control (MAC) addresses of WLAN-compatible devices, Bluetooth addresses and "LTE Direct expressions." Such addresses or radio identifiers are transmitted by the radio apparatuses when radio communication has not yet been established with a remote station, and the radio apparatus makes itself detectable by other radio apparatuses for the purpose of setting up radio communication.

The use of static addresses or radio identifiers of this kind results in the associated mobile devices being able to be detected and tracked on the basis of their radio signals that contain addresses or radio identifiers of this kind. This means that it is also possible for applicable movement profiles to be created without a user of the device noticing or needing to approve such profiling beforehand. For example, it is known that such movement profiles can be used to monitor persons unnoticed or to record and analyze the purchasing behavior of customers in shopping centers or the like. Applications are also constantly being developed, e.g. within the framework of what are known as location-based services, that are based on radio apparatuses (e.g., smartphones) being able to be identified in a local environment. Such applications, for example, make it possible to find friends by means of the radio apparatuses they are carrying, to discover offers from outlets close by, or to provide or activate services tailored specifically to a specific subscriber.

LTE Direct technology also provides for a publicly accessible database on what is known as an "Expression Name Server" or "ENS," in order to link the radio identifiers of subscribers, referred to as "LTE Direct Expressions," to associated expression owners (i.e., services, people, companies, organizations, etc.). A distinction is drawn between what are known as open expressions, on the one hand, for which the assignment between the expression and the expression owner is openly accessible, and restricted, or private, expressions, on the other hand. In the case of the latter, a requesting subscriber is notified of the assignment of expressions to the associated persons, etc., by the ENS only if appropriate authorization has been provided beforehand. To assign the radio identifiers to the respective expression owner, it is possible to use what is known as a cryptographic hash function, as is known from cryptology.

Against this background, individual approaches for protecting subscribers from unauthorized location and movement tracking by third parties are known from the prior art. "LEI, M. et al.; Protecting Location Privacy with Dynamic MAC Address Exchanging in Wireless Networks; Intelligence and Security Informatics; 2007 IEEE" describes a method that involves the MAC addresses of active subscribers in a local area network (LAN) being regularly interchanged among one another by means of unidirectional cyclic substitution, so that a firm assignment of MAC addresses to specific subscribers is cancelled. The mobile operating system iOS (iOS 8 version onward) from Apple, Inc. also uses, at least in certain situations, randomly generated MAC addresses instead of a unique MAC address for the applicable iOS device in the case of WLANs in order to protect against tracking.

Furthermore, authentication systems for access control for networks are known that involve cryptographic hash functions being used to regularly (e.g., every 30 seconds) generate a new password that is required for successful access in the applicable period up until the password is changed again. Such a system is the "SecurID" system from the RSA Security company, for example.

The German laid-open specification DE 102015204210 A1 describes a proposed solution for detecting mobile radio apparatuses by means of dynamic, pseudorandom radio identifiers. In particular, it describes methods for generating and transmitting such radio identifiers and for identifying a mobile radio apparatus on the basis of such radio identifiers. This involves a pseudorandom sequence of radio identifiers being generated using a generation rule and on the basis of an initialization with a predetermined initialization value referenced to a specific time. Radio signals that each contain one of the radio identifiers of the sequence as an identity linked to the transmitting radio apparatus can be transmitted and can be received by a remote station that likewise has the secret authorization information required for generating the sequence. The respective current radio identifier is selected from the sequence of radio identifiers using a predetermined deterministic update scheme.

The present invention is based on the object of providing an even more improved solution for protecting mobile radio apparatuses from detection and/or tracking thereof by unauthorized third parties.

A first aspect of the invention relates to a method for transmitting radio identifiers by means of a mobile radio apparatus. The method involves: repeatedly transmitting radio signals that each carry a radio identifier as an identity, linked to the radio apparatus, with respect to a receiver of the radio signals. This respective radio identifier is selected for each of the radio signals dynamically from a sequence of radio identifiers that is contained in a set M, wherein M contains a number of $N \in \mathbb{N}$ predefined sequences, which are each pseudorandom and, if N>1, are each different than one another, of radio identifiers.

The respective radio identifier is selected in that: if N=1, from the one sequence contained in M, a predetermined deterministic update scheme assigned to this sequence is used to select one of the radio identifiers contained in said sequence; and if N>1, one of the sequences is selected using a predetermined selection rule and, from the thus selected sequence, a predetermined deterministic update scheme assigned to this sequence is used to select one of the radio identifiers contained in said sequence.

The repeated transmission of the radio signals involves, at least for one of the radio signals, the associated transmission power and/or the associated transmission frequency being dynamically varied at the transmitter, using a predetermined deterministic variation scheme, in comparison with the transmission power and transmission frequency of an immediately preceding instance of the radio signals.

A "radio identifier" or "identifier" for short within the context of the invention should be understood to mean information (in particular a characteristic feature, character or a totality of characteristic features or characters) transmitted by means of a radio signal for uniquely identifying something, in particular the radio apparatus transmitting the radio signal. In particular, data or signals impressed on a radio signal, such as for example characteristic bit sequences or modulation signals, by means of which a source or a transmitter of the radio signal can be identified are a "radio identifier" within the context of the invention.

A "mobile radio apparatus," and variants thereof, within the context of the invention, should be understood to mean an apparatus by means of which radio signals that have at least one radio identifier can be transmitted and that is mobile. "Mobile" within the context of the invention should be understood to mean that the radio apparatus is designed to change its physical position, in particular to be physically moved within this context by a user (i) directly or (ii) indirectly by coupling or as part of a larger unit. In particular, portable terminals such as mobile phones, smartphones, smart watches, portable computers, including tablet computers, and radio apparatuses in or on vehicles, which are movable at least together with the vehicle or as part thereof, are mobile radio apparatuses within the context of the invention.

A "pseudorandom sequence" or "sequence" or "chain" of radio identifiers, and variants thereof, within the context of the invention should be understood to mean an ordered sequence of radio identifiers that can be generated deterministically and hence reproducibly using a generation rule, proceeding from an initial value as input value for the generation rule, and the sequence of individual radio identifiers of which is pseudorandom within the context of the standard mathematical meaning, that is to say that, although calculable, it cannot be distinguished, or can be distinguished only with very great difficulty, from real, i.e. nondeterministic, randomness from the perspective of the viewer.

A "value" or "input value" or "initial value" or "output value," and variants thereof, within the context of the invention should be understood to mean privately presentable information suitable for use as an input or output variable for the generation rule. As such, in particular bit sequences or alphanumeric characters (numbers, letters or special characters) and character strings comprising these can be "values" within the context of the invention.

A "deterministic update scheme," and variants thereof, within the context of the invention should be understood to mean a rule according to which it is explicitly determinable, for different times, which radio identifier from the sequence of radio identifiers is current, i.e. needs to be selected, at the time. In particular, a rule according to which the respective next radio identifier of the sequence is current at fixed identical intervals of time (periods), or according to which said identifier is current at different but predetermined intervals of time, is a deterministic update scheme within the context of the invention. The same applies in general to a rule, in particular a mathematical function, that allocates a respective specific radio identifier to different times on a time scale.

A "transmission frequency" of a radio signal, and variants thereof, within the context of the invention should be understood to mean a frequency or a frequency range, in particular a frequency band, that is used for transmitting the radio signal. In the simplest case, it can be a specific carrier frequency of the radio signal or an individual radio channel, defined by means of a frequency range, within a larger frequency range.

"Dynamic varying of the transmission frequency using a deterministic variation scheme," and variants thereof, within the context of the invention should be understood to mean that the respective transmission frequencies for successive radio signals are altered (in some aspects, repeatedly) in a deterministic manner defined by the variation scheme, so that the repeated transmission of the radio signals involves at least two (usually more) instances of the transmitted radio signals having a mutually different transmission frequency determined using the variation scheme. This varying of the transmission frequency is distinguished from, for example, a frequency change during modulation of the radio signal for the purpose of enriching information or impressing information, by means of frequency modulation (FM) or phase modulation or a combination of these. In the simple case of a carrier frequency, varying the transmission frequency corresponds to an alteration of the carrier frequency, while frequency modulation is known to produce a frequency fluctuation, determined by the information to be modulated, onto the carrier frequency, about the carrier frequency, which as such remains constant. A change of radio channel accompanying a change of frequency band is also varying of the transmission frequency within the context of the invention.

The method according to the invention for transmitting radio identifiers is used to transmit radio identifiers that are not trackable or predictable, or are trackable or predictable only with extreme difficulty, by an unauthorized third party, whereas the sequence of radio identifiers is readily able to be reconstructed by authorized third parties and can be used to detect the transmitting radio apparatus on the basis of its radio identifiers. In contrast to the solution described in DE 102015204210 A1, in which only a single sequence rather than deliberate variation of the transmission powers or transmission frequencies of the radio signals is described, a deliberate varying takes place in the case of the present invention. In this manner, it is made even more difficult for an unauthorized receiver to detect an assignment of the radio signals to a specific transmitter (or, for example, a specific vehicle having such a transmitter) for which a specific constant transmission frequency or a transmission frequency shifted by Doppler effect on approach or departure as appropriate and a radio signal strength at a receiver corresponding to the distance between a transmitter and the receiver would typically be expected, of course.

During a radio transmission, it is inevitably also possible for other receivers that are in the reception range of a radio signal to receive the radio signals. From the signal strength of such a radio signal, measured at the receiver, it is possible to estimate the distance between the transmitter and the receiver. It is also possible to estimate the relative speed between the transmitter and the receiver from the frequency of the radio signal, as measured at the receiver end, if the transmission frequency is known, by means of the Doppler effect. A change of signal strength or a signal frequency divergence is usually interpreted as a change of distance. A transmission power that is now consciously altered according to the invention, and hence a receiver-end signal strength or a transmission frequency deliberately altered at the transmitter end, therefore imitates an altered transmitter distance and speed to undesirable eavesdroppers. This makes it difficult to discover a position of the transmitter. Undesirable eavesdroppers can be confused in this manner and the particular position of the transmitter can be concealed. Assignment of a signal to the transmitter is therefore hampered. This applies even if the transmitter is part of a vehicle (e.g., a motor vehicle), which means that the position and the association of the signal with a specific vehicle is concealed in this manner. Such a transmitter can be provided in order to convey measurement data captured by sensor (for example from a tire pressure sensor) wirelessly within the vehicle, for example to a control unit.

Moreover, the present invention can optionally also involve the use of multiple (N>1) different pseudorandom sequences, so that a next radio identifier to be used for transmitting a signal is selected not just from a single sequence but rather from a set of different sequences. In this manner, the security level with regard to unauthorized identification or tracking of the transmitter can be increased even further, since attacks based on a correlation analysis e.g., a correlation analysis of the change of radio identifiers over time) are additionally hampered. The use of a plurality of different radio identifier chains (i.e., radio identifier sequences) therefore means that the assignment of a detected signal correlation to a specific individual transmitter is hampered for an authorized eavesdropper or attacker, at least provided that at least two different transmitters transmit in the same period. Authorized receivers, on the other hand, are able to take their knowledge of the associated generation rules and initializations for the respective individual pseudorandom sequences and of the selection rule for selecting a sequence to be used from the set of sequences as a basis for tracing, as a basis for the transmitter-end radio identifier selection based thereon, and as a basis for synchronizing themselves to the transmitter end in this regard. In this manner, detection of the transmitting radio apparatus or of the radio signals thereof even over a change of radio identifier is made possible at the receiver end.

The invention is applicable for a wide variety of radio transmissions, including for analog and digital, and also for packet or signal-stream-based transmission methods.

Other objects, advantages, aspects and features of the present invention will be apparent to one skilled in the relevant art in view of the following detailed description of one or more exemplary embodiments.

BRIEF DESCRIPTION OF THE DRAWINGS

The features, objects, and advantages of the present invention will become more apparent from the detailed description, set forth below, when taken in conjunction with the drawings, in which like reference characters identify correspondingly throughout and wherein.

DETAILED DESCRIPTION OF THE PREFERRED EMBODIMENTS

Figure 1:
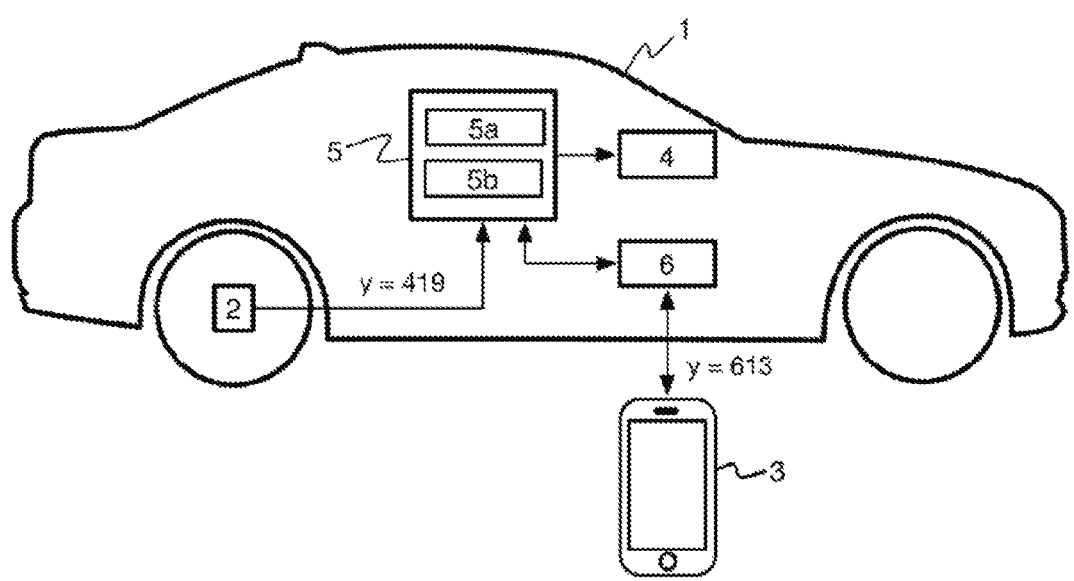
FIG. 1 schematically shows a vehicle and mobile radio apparatus according to at least one aspect of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention. It will be understood that while at least one embodiment is described below, the various embodiments or aspects thereof are combinable with one another unless expressly ruled out or technically impossible.

In some embodiments, the method involves generating or retaining the N pseudorandom sequences of radio identifiers of the set M by means of the mobile radio apparatus, wherein each of the sequences is based on a respective generation rule assigned to said sequence and an initialization of the sequence with an initialization value assigned thereto that is referenced to a specific time. In this manner, the mobile radio apparatus itself is rendered able to generate or retrieve the required radio identifiers without this requiring, during its operative mode, an external data source for providing this information.

In some embodiments, the variation scheme is used to vary the transmission power, in particular as a whole or in sequence-based fashion, for successive radio signals by combining, in particular additively overlaying, a first variation with a second variation, wherein the first variation is defined by means of a trend function, defined for the sequence of radio signals, that in turn stipulates a systematic variation of the transmission power for this sequence. This systematic variation is defined over a sequence of at least three successive radio signals and has a monotonously rising or falling characteristic. The second variation is carried out for each radio signal affected by the varying and is pseudorandomly controlled in a deterministic manner. In this manner, a steadily departing or approaching transmitter can be simulated at least over a specific period or a specific subsequence of the radio signals.

In some embodiments, to this end, the variation scheme is used to determine the transmission power for a next radio signal, affected by the varying, starting from a transmission power stipulated for a preceding radio signal affected by the varying, by adding a function value, obtained for this next radio signal, of the trend function according to the first variation and a pseudorandomly generated random number according to the second variation. Optionally, in an embodiment that is particularly simple to implement, the trend function can in particular also be a constant function (which, in the case of periodically transmitted radio signals, corresponds to a linear rise or fall in the transmission power and hence, at the receiver end, based on the received signal strength, apparently corresponds to a constant relative speed between the transmitter and the receiver) and therefore defined by means of a constant trend value as function value. As such, the transmission power $P_s(i+1)$ of said next radio signal can easily be represented by the transmission power $P_s(i)$ of said preceding radio signal as follows:

$$P_s(i+1)=P_s(i)+T(i+1)+Z(i+1)$$

where the index i numbers the respective successive radio signals whose transmission powers are varied using the variation scheme, T(i) indicates the trend function, which may be $T(i+1):=T=$constant (with the trend value T), and $Z(i+1)$ is a pseudorandom number whose absolute value preferably adheres to $|Z(i+1)|<|T(i+1)|$, so that the trend function dominates over the random component and hence the concealment effect thereof is not canceled again by the random component used for further hampering assignment to a transmitter.

In particular, according to the variation scheme for the trend function, the average period of time between two immediately successive turning points at which the function changes from a monotonously rising characteristic to a monotonously falling characteristic or vice versa is preferably longer than the average corresponding period of time for the second variation.

In some embodiments, if N>1 then the varying of the transmission power and the transmission frequency for successive radio signals using the variation scheme is defined in sequence-based fashion, so that, for at least one specific instance, preferably for all, of the sequences, a varying of the transmission power and the transmission frequency that is independent of the corresponding varying for any other sequence is effected for those successive radio signals that carry a radio identifier from this specific sequence. In this manner, the complexity of the totality of the radio signals received by an unauthorized eavesdropper and hence also the concealment effect can be increased further still. In particular, correlation-based attacks are thus hampered further.

In some embodiments based thereon, according to the variation scheme the varying of the transmission power and the transmission frequency for the successive radio signals that carry a radio identifier of the respective at least one specific sequence is at least sometimes pseudorandomly controlled in a deterministic manner. On the one hand, this allows implementation of a variation that is not traceable by the unauthorized eavesdropper but that is, on the other hand, traceable by the authorized receiver on the basis of its deterministic generation rule, so that the receiver can gear itself to accordingly variable received signal strengths and/or transmission frequencies for the purpose of error-free reception of the radio signals.

In some embodiments, both a trend function and the sequence-based varying of the transmission power and the transmission frequency for successive radio signals are used. Preferably, according to the variation scheme, the respective varying of the transmission power of at least two of the N>1 sequences is carried out by means of an individual trend function assigned to the respective sequence, wherein at least two of the trend functions have no correlation between them. As such, the desired concealment can be reinforced further and in particular the difficulty for correlation-based attacks can be increased further.

In some embodiments, the number N of sequences in the set M from which that sequence from which the next radio identifier to be used for transmitting one of the radio signals is to be selected is selected using the selection rule is dynamically varied. This can, according to different variants, be achieved in particular by means of one or more of the following measures: (i) generating one or more new sequences; (ii) deleting one or more already existent sequences; (iii) at least temporarily activating or deactivating one or more already existent sequences, so that only currently activated sequences are selectable using the selection rule, while currently deactivated sequences are selectable again only after fresh activation. In this manner, the difficulty for identifying and tracking a specific transmitter and hence the security of the method can be increased even further, since a fixed number of different sequences is now not used. Instead, the number of sequences available at a given time for selecting a radio identifier is a further variable and hence, from the point of view of the attacker, an increased complexity.

In some embodiments, at least one of the measures for dynamically varying the number of sequences is pseudorandomly controlled in a deterministic manner. Hence, this instance involves not only (i) the generation of the respective sequences in pseudorandomly controlled fashion in each case, but (ii) also the stipulation of the number of currently available sequences and (iii) —at any rate in some variants (see above) —also the selection of a specific sequence from the set of currently available sequences according to the selection rule. Therefore, deterministic and therefore also particularly efficient reconstruction of the selection of the radio identifier made at the transmitter is possible at the receiver for each of the radio signals in all of said cases (i) to (iii).

In some further embodiments, when a new sequence is generated or an already existent sequence is activated, deactivated or deleted, applicable logon and logoff information for the sequence is sent to the receiver of the radio signals in a manner protected against unauthorized access. In this manner, the receiver or receivers can be notified of which sequences are currently available or being used, in order for the transmitter to send a next radio signal having an applicable radio identifier selected from these sequences. This logon and logoff information can be sent to the receiver or receivers in particular by means of encrypted communication.

In some further embodiments, (i) a new sequence is generated such that the transmission power and/or the transmission frequency of the radio signals transmitted with a radio identifier from this new sequence initially rises monotonously, in particular from a minimum value defined for the transmission power, for a sequence of at least three immediately successive instances of these radio signals and/or (ii) an already existent sequence is deleted such that prior to that the transmission power and/or the transmission frequency of the radio signals carrying a radio identifier from this already existent sequence initially falls monotonously for a sequence of at least three immediately successive instances of these radio signals, in particular from a minimum value defined for the transmission power. In this manner, the unauthorized eavesdropper can be given the impression that, in the first case (i), a remote transmitter (or a remote vehicle) is coming into range, or, in the second case (ii), a remote transmitter (or a remote vehicle) has gone out of range. In this manner, the concealment effect is therefore reinforced, since actually the transmitter may even still be positioned at the same distance from the eavesdropper within the range or even moving away from or towards said eavesdropper.

In some embodiments, if N>1, the predetermined selection rule is used to select that sequence from which the next radio identifier to be used for transmitting one of the radio signals is to be selected in one of the following ways: (a) deterministically, in particular using a deterministic random number generator; (b) non-deterministically, in particular using a nondeterministic random number generator. Variant (a) with deterministic, in particular pseudorandom, selection of a sequence has the advantage that the relevant sequence can be selected at the receiver directly on the basis of knowledge of the selection rule. Variant (b), by contrast, provides an even higher level of security against tracking on the basis of the nondeterministic selection, but at the cost of increased sophistication at the receiver, since the sequence corresponding to the received radio identifier cannot be determined deterministically there. Instead, it first needs to be found on the basis of usually multiple comparisons of the received radio identifier with the applicable radio identifiers respectively determined from the available sequences.

In some embodiments, the selection of that sequence from which the next radio identifier to be used for transmitting one of the radio signals is to be selected is made using the selection rule on the basis of the type of the information to be conveyed to the receiver by means of the radio signal. In one possible variant in this regard, the selection of that sequence from which a selection is to be made for a radio identifier for a next radio signal for conveying a specific type of information is made using the selection rule on the basis of the type of information in such a manner that (i) respective different assigned subsets of the set of sequences that is formed from the plurality of sequences are defined for different types of information, and (ii) the selection of the radio identifier for the information to be conveyed with the radio signal is made only from those sequences that are contained in the subset of sequences that is assigned to the type of information to be conveyed with the radio signal. By way of example—and without this being intended to be interpreted as a limitation—a set consisting of four active sequences Seq1 to Seq4 divided into a first subset containing the sequences Seq1 and Seq2 and a second subset containing the sequences Seq3 and Seq4 could be available for conveying different types of sensor data to a central control unit in a vehicle by radio. The sequences Seq1 and Seq2 in the first subset could be used just for conveying tire pressure data captured by pressure sensors on the tires, while the sequences Seq3 and Seq4 in the second subset could be used just for conveying exterior temperature data captured by means of a temperature sensor. These embodiments firstly make it easier for the respective receiver to find the correct assignment for specific data, because said receiver can limit itself to sequences from the respective subset assigned to the data when finding the relevant radio identifier. On the other hand, they simultaneously also increase the diversity of the sequences among one another and therefore further hamper a successful correlation analysis for the diversely appearing sequences in regard to the same transmitter. As such, for example a good many sequences usually appear to be much more active than others, which means that they cannot readily be assigned to one another as associated with the same transmitter on the basis of a comparable, in particular uniform, activity.

In some embodiments, at least one radio signal from the transmitted sequence of radio signals, which radio signal is selected in a predetermined manner, in particular pseudorandomly selected in a deterministic manner, additionally carries information indicating the occurrence of a transmission error independently of an actual occurrence of a transmission error in a preceding instance of the radio signals. This information can be or contain in particular a request for fresh transmission of the last radio signal. In this manner, additional confusion for an unauthorized eavesdropper in regard to a real receiver situation can be produced by virtue of reception difficulties being simulated.

A second aspect of the invention relates to a method for identifying a first mobile radio apparatus on a receiving apparatus, in particular a second mobile radio apparatus. The method comprises the following steps: (i) receiving a radio signal that carries a radio identifier as an identity linked to a signal source transmitting the radio signal, wherein a dynamic configuration of the receiving apparatus for a received signal strength and/or a reception frequency for receiving the radio signal is performed using a deterministic variation scheme that corresponds to that of the transmitter end for the radio signal and is synchronized thereto; (ii) comparing the radio identifier of the received radio signal either (a) with a radio identifier from a predetermined sequence of radio identifiers, wherein the radio identifier is selected from the radio identifiers defined by the sequence, using a predetermined deterministic update scheme assigned to this sequence; or (b) with one or more radio identifiers that are each selected from another sequence, which are selected from a plurality of predefined, different and respectively pseudorandom sequences of radio identifiers using a predetermined selection rule, using a predetermined deterministic update scheme assigned to the respective selected sequence; and (iii) triggering a predetermined functionality on the receiving apparatus only if the comparison reveals that the received radio identifier is concordant with one of the radio identifiers compared therewith according to a predetermined comparison criterion.

The method according to the invention for identifying a first (transmitting) mobile radio apparatus on a receiving apparatus can be used on the latter to check whether a received radio signal is associated with a first mobile radio apparatus or is an identity thereof for which the receiving apparatus has authorization to trace the radio identifier sequences thereof. If this is the case, the first radio apparatus can also be tracked by the authorized receiving apparatus by means of the radio identifiers of said first radio apparatus, despite said radio identifiers changing over time, and a communication connection can therefore be started or continued. This is not possible for unauthorized receiving apparatuses, on the other hand, owing to a lack of traceability of the series of radio identifiers used. During authorization, the receiver apparatus is notified of all information (authorization information) that is required in order to render the receiver apparatus capable of using, in particular itself generating, the same sequences of radio identifiers as the first radio apparatus. Furthermore, the receiving apparatus is similarly also rendered capable of itself determining the respective signal strengths and/or reception frequencies to be expected for the series from radio signals transmitted by the first radio apparatus that are to be received, and accordingly configuring itself to receive these radio signals, in particular by setting an appropriate signal gain and/or tuning to the reception frequencies in the received signal path of the receiving apparatus.

The authorization information regularly contains for each of the sequences at least the generation rule, an associated initialization value referenced to a specific time and the update scheme. Moreover, authorization information contains the selection rule for selecting the sequences to be used for a specific radio signal. The update scheme and the coupling of the initialization value to a specific time can be used by the transmitting first radio apparatus and the receiver apparatus to generate identical and temporally coordinated sequences of radio identifiers for each of the sequences on the basis of the same generation rule or to select from a plurality of retained or accessible sequences, so that the current radio identifiers from the transmitter-end sequence are identical to the corresponding receiver-end sequences at a given time.

The methods according to the first and second aspects of the invention, in particular when interacting, can in particular also be used to achieve the following advantages: first, increased data protection can be attained, since trackability by means of radio identifier comparisons, in particular network address comparisons, in the case of static radio identifiers is no longer possible, whereas this continues to be possible for authorized receiver apparatuses. There is also no requirement for external mediators or databases, such as for example the ENS in the case of the conventional LTE Direct approach, which prevents firstly higher technical complexity and higher costs, but secondly also the possibility of misuse. In particular, such tracking by the operator of an ENS is prevented or at least hampered. In addition, the required data traffic is reduced in comparison with centralized solutions by the disappearance of a central location (e.g. ENS), since no further queries from subscribers are required at the central location because the required authorization information is retained locally instead. Even if a central database is also used, for example in order to make information associated with the individual subscribers or radio apparatuses available to third parties, if this database ever fails then detection and tracking of mobile radio apparatuses acting as transmitters remains available as part of the authorizations therefor, since this is no longer dependent on the central database or location.

In some of these embodiments, (i) the one or more sequences to be selected using the selection rule are selected at the receiver on the basis of the type of information contained in the received radio signal in such a manner that different assigned subsets of the set of sequences that is formed from the plurality of sequences are respectively selected for different types of information; and (ii) the radio identifiers are selected for comparison with the radio identifier of the received radio signal only from those one or more sequences that are contained in the subset of sequences that is selected in this manner and assigned to the type of information from the received radio signal. In this way, the receiver end can restrict itself to a smaller number of sequences and hence radio identifiers therefrom that can be used for the comparison with the radio identifier of the received signal even in the case of a nondeterministic selection rule when receiving a radio signal and identifying its transmitter end (mobile radio apparatus). This can increase efficiency at the receiver end and, moreover, in interaction with the corresponding transmitter end, allows higher diversity among the sequences to be achieved. As such, in particular undesirable attacks based on correlation analyses of the diversely appearing sequences are hampered further. The sequences used for radio transmission of the radio signals from the same transmitter end can thus have significantly different frequencies of use among one another and can appear to be associated with different transmitters, for example, since they cannot be assigned to one another on the basis of a uniform activity, for example.

In some embodiments, the predetermined functionality is dependent on the respective radio identifier detected by the comparison. In this way, at least one assigned functionality can be triggered specifically for each detected radio identifier, so that there can be provision at the receiver for a distinction in regard to the reaction to different transmitting radio apparatuses. In particular, in the case of a receiver apparatus in a vehicle, it is thus possible for different functionalities to be triggered for a received radio signal from a specific first vehicle sensor than when receiving a radio signal from a second sensor or even a vehicle-external radio apparatus, for example a smartphone of the vehicle owner. The first sensor could thus be a temperature sensor, for example, and the associated functionality to be triggered could be updating a temperature indicator in the vehicle. The second sensor could be a fill level sensor (e.g. for screen wash) and the functionality to be triggered could be checking the sensor signal against a minimum value and, if the minimum value is not reached, triggering a warning signal. When the smartphone of the user is detected, a welcome presentation could be triggered if the vehicle is simultaneously locked or the engine is switched off.

In some embodiments, each of the pseudorandom sequences of radio identifiers is generated reproducibly using a generation rule, proceeding from an initial value as input value for the generation rule. The generation rule comprises the iterative use of a cryptographic hash function that, on every iteration, provides an output value for the respective iteration from at least one input value, said output value being used to derive the radio identifier for the associated element of the sequence of radio identifiers. The initialization value is used as an input value for the first iteration, and the respective output value of the immediately preceding iteration is used as an input value for the subsequent iterations. In this way, it is possible to use a mathematical function to iteratively generate a pseudorandom sequence of identifiers in a compact manner. This sequence can at least sometimes be generated in advance already, so that when the radio identifier is updated only a respective next radio identifier, already generated beforehand, from the sequence is selected as current radio identifier. Alternatively, the respective next radio identifier can instead be generated again by means of the hash function during the next update each time, so that there is advantageously no requirement for a memory for retaining radio identifiers already generated in advance. Hybrid forms of these are also possible.

The term "cryptographic hash function," and variants thereof, is consistent with the meaning thereof as used in cryptology. What is involved is thus a hash function that, in the mathematical sense, is collision-resistant or a one-way function (or both). A hash function is a function that maps a character string of arbitrary length onto a character string of fixed length. A one-way function in this instance is a function H for which it is practically impossible to find for a given output value y an input value x that the hash function maps onto y(H(x)=y). A hash function is (weakly) collision-resistant if it is practically impossible to find for a given value x a different value x' that results in the same hash value H(x)=H(x')=y for x≠x'. When collision resistance is strong, both input values x and x' can moreover be chosen freely. Known more recent variants of cryptological hash functions are known by the names FORK-256, SHA-3 and BLAKE. In addition, there are also many further cryptological hash functions with different security levels.

In some embodiments, the associated radio identifier for at least one of the iterations is generated by applying an information-reducing derivation rule to the output value of this iteration. In this manner, it is firstly possible to use output values for the cryptographic hash function that contain more information or have a different format than the radio identifier. The format of the radio identifier may be in particular standardized in some applications. Secondly, it also allows an additional security benefit to be achieved because recovering the output values of the hash function from the radio identifiers received by an unauthorized third party and prediction of future sequence elements on the basis thereof is additionally prevented, at any rate hampered.

In some embodiments, the information-reducing derivation rule of at least one of the sequences defines a selection of a subset of symbols from a symbol-based, in particular numeric or alphanumeric, representation of the output value. In this manner, a simple implementation of the information-reducing derivation rule is possible without great sophistication, since no further calculations are required therefor. In particular, primitive masking or filtering of specific places in the representation of the output value of the hash function is sufficient.

In some embodiments, the update scheme of at least one of the sequences defines regular replacement of the current radio identifier the respective next radio identifier from the sequence of radio identifiers after a predetermined period of time has elapsed in each case. The predetermined period of time can be chosen either to be the same for all updates or, instead, to be different for different updates.

In some embodiments, the radio identifiers are network addresses or radio channels in a local radio network or are derived therefrom. In particular, in some embodiments, the radio identifiers to be compared can each be network addresses or radio channels in at least one of the following: (i) a WLAN network, (ii) a Bluetooth® network, and (iii) a mobile radio network, in particular an LTE network, preferably of a wireless onboard network in a vehicle.

A third aspect of the invention relates to a mobile radio apparatus. This has (i) a communication device for radio communication with a remote station and (ii) a processing device for generating pseudorandom sequences of radio identifiers and for selecting radio identifiers from the sequences. The mobile radio apparatus is configured to carry out the method according to the first and/or the second aspect of the invention.

The term "configured," and variants thereof, within the context of the invention should be understood to mean that the applicable apparatus is set up (or able to be set up in the case of "configurable") to perform a specific function. The configuration can take place for example by means of appropriate setting of parameters of a process sequence or of switches or the like for activating and deactivating functionalities and settings—or bay any other appropriate setting of hardware and/or software. In particular, the apparatus can have multiple predetermined configurations or modes of operation, so that the configuration can be performed by selecting one of these configurations or modes of operation.

In some embodiments, the radio apparatus is coupled to or integrated in a functional component of a vehicle such that during operation the radio apparatus uses the method according to the first aspect to transmit radio identifiers, or uses the method according to the second aspect to receive and evaluate radio identifiers, by means of which, in the case of transmission, the functional component itself is identifiable or, in the case of reception, another radio apparatus is identifiable to the functional component. In some embodiments, the functional component is a control unit, a sensor, in particular a tire pressure sensor, an actuator, or gateway to an onboard network of the vehicle.

A fourth aspect of the invention relates to a system for transmitting and identifying radio identifiers. The system has (i) at least one first mobile radio apparatus according to the third aspect of the invention, which is configured or configurable to carry out the method according to the first aspect of the invention, in particular according to one or more of the associated embodiments described herein. Moreover, the system (ii) has at least one receiving apparatus, in particular at least one second mobile radio apparatus, which is configured or configurable to interact with the at least one first mobile radio apparatus acting as a transmitter to carry out the method according to the second aspect of the invention, in particular according to one or more of the associated embodiments described herein.

In some embodiments of the system, the second mobile radio apparatus is also set up to transmit radio signals, in particular to the first radio apparatus, using the method according to the first aspect, specifically such that the varying of the transmission power and/or transmission frequency of radio signals transmitted by the first radio apparatus is effected in the same way as and in synchronization with the varying of the transmission power and/or transmission frequency of radio signals transmitted by the second radio apparatus. These embodiments are advantageously usable in particular when both radio apparatuses are moved in combination with one another, for example when they are both installed in the same vehicle, because synchronous transmission-power and transmission-frequency variations, as expected, are then generated for an unauthorized eavesdropper. The two radio apparatuses can synchronize themselves explicitly, for example, such as for example by means of a message or a portion thereof (or else implicitly, for example by means of measurements of the signal strengths and transmission frequencies of the respective other radio apparatus).

A fifth aspect of the invention relates to a vehicle, in particular a motor vehicle, having a mobile radio apparatus according to the third aspect of the invention or a system according to the fourth aspect of the invention.

The features and advantages illustrated with reference to the first aspect (at the transmitter) or the second aspect (at the receiver) accordingly also apply to the other aspects of the invention accordingly.

Turning now to FIG. 1, a vehicle, more precisely a motor vehicle 1, that has multiple functional components, is shown. A first of these functional components is a tire sensor 2 designed to measure the tire pressure and the speed of the wheel and to convey each of these measured values to a control unit 5 via a radio connection. A further functional component of the vehicle is a locking system 4, which acts as an actuator and can be actuated by the control unit 5 in order to open or lock the vehicle. A gateway (protocol converter) 6 is provided as a further functional component, which is an interface between, on the one hand, an air interface to a mobile radio apparatus 3, in particular a smartphone, which uses LTE technology, in particular uses LTE Direct in conjunction with LTE-D2D (LTE Device-to-Device), or WLAN to communicate with the gateway 6, and, on the other hand, an onboard network of the vehicle 1, to which the control unit 5 is also connected wirelessly or by wire or optically. The connection can be made in particular via a known bus system, such as for example a standardized CAN or MOST bus that is known for motor vehicles, or Ethernet.

All of these functional components each have an incorporated radio communication apparatus or are themselves such an apparatus, and in each case, this is—again as part of the vehicle—a mobile radio communication apparatus within the context of the invention. Each of these radio communication apparatuses has a processing unit and a communication unit. This is depicted in FIG. 1 by way of example for the functional component control unit 5, which has a processing unit 5a and a communication unit 5b. The arrows in FIG. 1 are typical communication directions between the functional components and the vehicle-external smartphone 3.

A first application for the invention in this situation could be that an approach of the smartphone 3 of the vehicle owner is detected by setting up a radio connection to the gateway 6 by using a radio identifier selection from multiple radio identifier sequences (N>1 case) of the smartphone 3 that are known to the gateway 6 but otherwise secret. The gateway 6 reports this via the onboard network on to the control unit 5, which in turn uses a radio connection to use a radio identifier selection from a plurality of other radio identifier sequences that are known to the processing unit of the locking system 4 but otherwise secret to activate the locking system 4 by means of an appropriate radio signal, in order to unlock the vehicle.

In another application, a radio connection is made between the tire sensor 2, which, as part of the moving wheel of the vehicle, executes a rotational movement relative thereto while traveling, and the control unit 5, wherein the tire sensor 2 acts as a transmitter for conveying measurement results concerning the tire pressure and transmits its radio signals to the control unit 5, acting as receiver, with radio identifiers according to a radio identifier selection from a radio identifier sequence (N=1 case) or else a plurality of secret radio identifier sequences (N>1 case) individual to said sensor, which is or are known to the control unit 5, however, or is or are able to be reconstructed there on the basis of the associated authorization information. In the same way, the likewise measured rotation speed can also be conveyed, either with the same radio signal or else with an individual dedicated radio signal on the basis of a radio identifier selection from other sequences of radio identifiers. The authorization information for the tire sensor 2 may in particular already have been stored in the control unit 5 during an initialization at the factory. When the measurement results are conveyed, the transmitter dynamically varies the associated transmission power and/or the associated transmission frequency for at least one of the radio signals in comparison with the transmission power and/or transmission frequency of an immediately preceding instance of the radio signals using a predetermined deterministic variation scheme, in particular as described in more detail below with reference to FIGS. 2, 3 and 6A-C.

Figure 2:
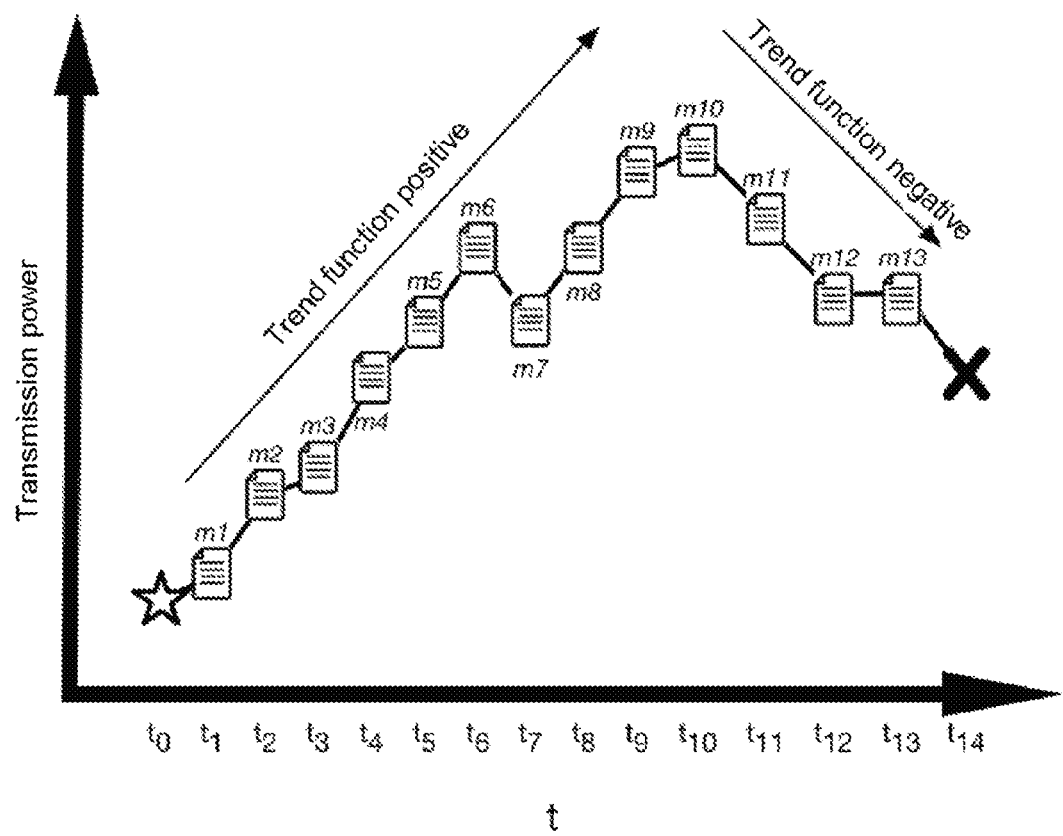
FIG. 2 shows a graph illustrating methods according to at least one aspect of the invention, with regard to variation of transmission power.

FIG. 2 is a schematic timing chart to fundamentally illustrate the methods according to the invention with regard to a transmitter-end variation of the transmission power. It shows an exemplary time characteristic for a variation, used at the transmitter for transmitting successive radio signals $m_1$ to $m_{13}$ at the times $t_1$ to $t_{13}$, of the applicable transmission power. The individual radio signals $m_1$ to $m_{13}$ can each contain a radio identifier comprising (i) a sequence S1 that is the same for all radio signals (N=1 case, cf. FIG. 4) or else (ii) different sequences S1 to SN (>1 case, cf. FIG. 5).

At the same time, FIG. 2, in a different interpretation for the N>1 case, depicts a preferred embodiment in which, in this instance, only the characteristic of the transmission power with reference to radio signals from only one specific sequence from the set M of the sequences S1 to SN is depicted. The sequence is generated at the time $t_0$ and, after the radio signals $m_1$ to $m_{13}$ have been transmitted, deleted again at the time $t_{14}$ (cf. more accurate illustration in this regard in the description relating to FIG. 5). In this interpretation, $m_1$ to $m_{13}$ denote only those radio signals that contain a radio identifier from the specific sequence, while radio signals having radio identifiers from other sequences can be transmitted between the radio signals $m_1$ to $m_{13}$ during the same period defined by $t_0$ and $t_{14}$, so that by and large a mixture of radio identifiers used from different sequences is obtained over the period (cf. FIG. 5). The varying of the transmission power and the transmission frequency for successive radio signals using the variation scheme is therefore defined in sequence-based fashion in this instance, so that, for at least one specific sequence, preferably for all of the sequences, a varying of the transmission power and the transmission frequency that is independent of the corresponding varying for any other sequence is effected for those successive radio signals that carry a radio identifier from this specific sequence. In this way, the complexity of the totality of the radio signals received by an unauthorized eavesdropper and hence also the concealment effect can be increased further still. In particular, correlation-based attacks are thus hampered further.

The variation scheme used to vary the transmission power in a deterministic manner in the example from FIG. 2 is defined such that the transmission power for a respective next radio signal is varied proceeding from a transmission power stipulated for a preceding radio signal by means of two mutually independent variations. The first of these variations consists in adding a function value, obtained for this next radio signal $m_i$, of a trend function T(i)—which in this instance is chosen in exemplary fashion as a periodically constant function T(i)=constant. In this case it is defined as positive as T(i)=T1=constant, where T1>0 for i=1, . . . , 10, for the time period up to $t_{10}$ and negative as T(i)=T2=constant, where T2<0 for i=11, . . . , 13, for the subsequent time period from $t_{11}$ to $t_{14}$. The second of the variations is effected by adding a pseudorandomly generated random number Z(i). The choice of the trend function as a periodically constant function can be implemented particularly easily and used in particular to imitate an apparently constant relative speed between the transmitter and the receiver.

The transmission power $P_s(i+1)$ of the respective next radio signal $m_{i+1}$ can therefore easily be represented by the transmission power $P_s(i)$ of said preceding radio signal as follows:

$$P_s(i+1)=P_s(i)+T(i+1)+Z(i+1)$$

where the index i numbers the respective successive radio signals whose transmission powers are varied using the variation scheme and T(i) indicates the trend function, which—as depicted in FIG. 2—may in particular also be periodically constant. Z(i+1) is the pseudorandom number according to the second variation, whose absolute value preferably adheres to $|Z(i+1)|<|T(i+1)|$, so that the trend function dominates over the random component and hence the concealment effect thereof is not canceled again by the random component used for further hampering assignment to a transmitter. In particular, according to the variation scheme for the trend function, the average period of time between two immediately successive turning points at which the function changes from a monotonously rising characteristic to a monotonously falling characteristic or vice versa is preferably longer than the average corresponding period of time for the second variation. This case is likewise depicted in FIG. 2, where the fluctuations in the transmission power about the rising and falling branches of the transmission power curve, which are contingent upon the value T1 and the value T2, respectively, change from radio signal to radio signal and therefore have a much higher frequency than the change in the function values of the trend function T(i). In other exemplary variants (not depicted), the trend function T(i) may be stipulated in particular sinusoidally or as a polynomially defined curve, in particular also only periodically. As such, the trend function may be defined as a sinewave half-cycle, for example.

Figure 3:
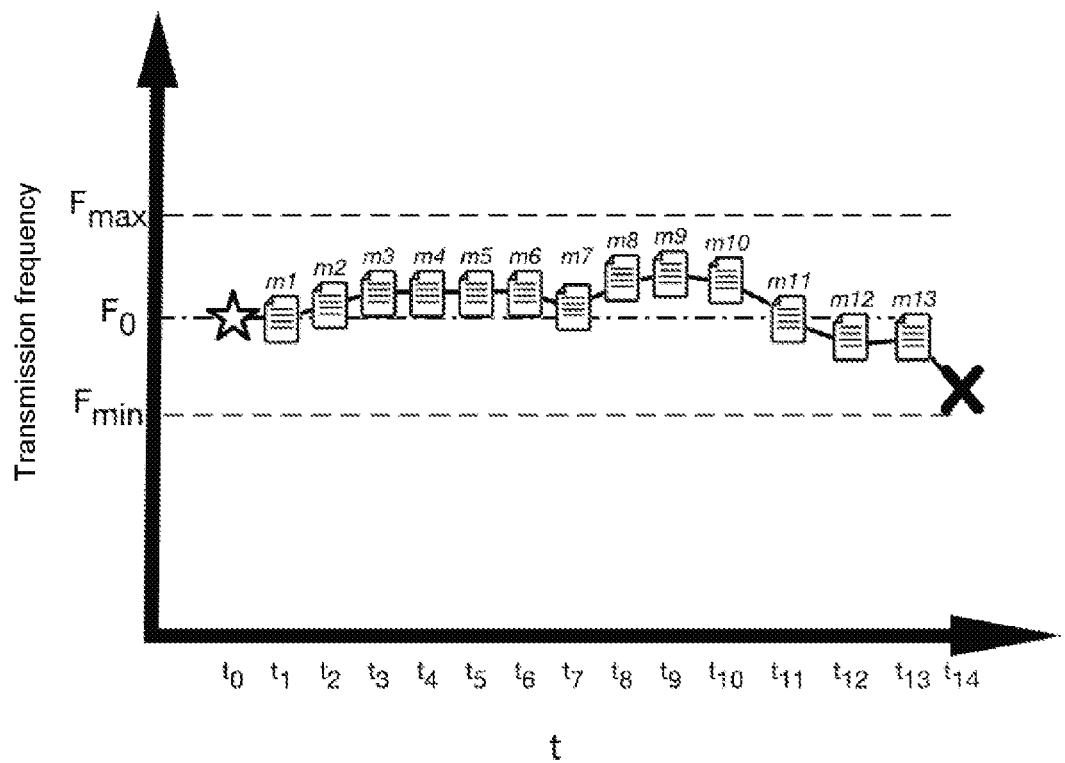
FIG. 3 shows a graph illustrating methods according to at least one aspect of the invention, with regard to variation of transmission frequency.

FIG. 3 similarly illustrates an exemplary embodiment with regard to a variation of the transmission frequency. Instead of or in addition to the transmission power, a variation of the transmission frequency is performed in this instance proceeding from a predetermined transmission frequency $F_0$, which in particular can correspond to a central frequency of a specific prescribed frequency range [Fmin; Fmax] to be used for transmitting the radio signals, which frequency range in particular can correspond to a specific radio channel according to a transmission technology used. The variation of the transmission frequency can be defined in particular periodically such that in the respective period the transmission frequency used for the radio signals transmitted therein is always higher than $F_0$ or always lower than $F_0$, which can be used to simulate an approach or departure by the transmitter to or from the receiver on the basis of the known Doppler effect. In the example shown in FIG. 3, the radio signals $m_1$ and $m_{11}$ are transmitted at $F_0$, whereas the successive radio signals $m_2$ to $m_{10}$ are transmitted at a transmission frequency above that, while the signals $m_{12}$ and $m_{13}$ are transmitted at a transmission frequency below $F_0$. As already explained in relation to FIG. 2, the graph, depending on interpretation, can relate (i) to the case in which it describes transmission frequency independently of sequences used for selecting the applicable radio identifier of the signals, or else (ii) to the case in which it describes the variation of the transmission frequency of only one specific instance of the sequences N in the N>1 case in sequence-based fashion.

Figure 4:
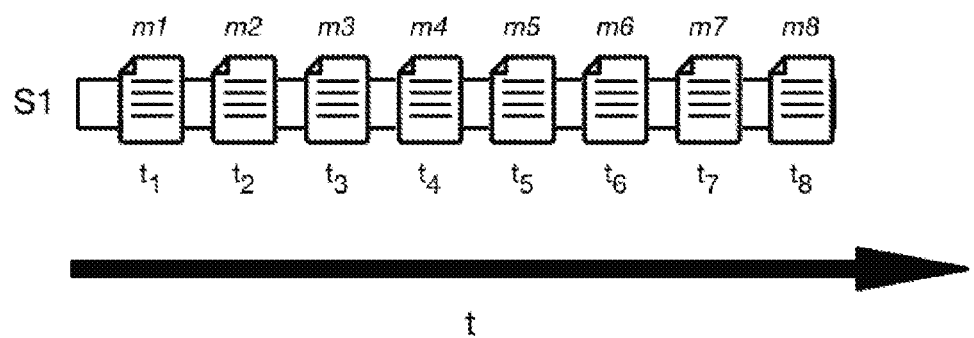
FIG. 4 shows a graph illustrating methods according to at least one aspect of the invention, with regard to a case in which only one sequence is used (i.e., N=1 case)

FIG. 4 depicts a graph to fundamentally illustrate the methods according to the invention based on the first and second aspects of the invention on the basis of an exemplary embodiment with regard to the case in which only one sequence S1 is used (N=1 case). Consequently, the radio identifiers of the various successive radio signals—which are shown in this instance in exemplary fashion as radio signals $m_1$ to $m_8$—are taken from this one, i.e. the same, sequence S1, wherein they are each generated using the update scheme associated with the sequence, and are therefore different than one another. The advantage of this embodiment lies in a particularly simple solution that is implementable with particularly low resource involvement. Accordingly, the transmission power and/or transmission frequency shown in FIG. 2 and FIG. 3 are varied with reference to this one sequence S1 in this instance.

Figure 5:
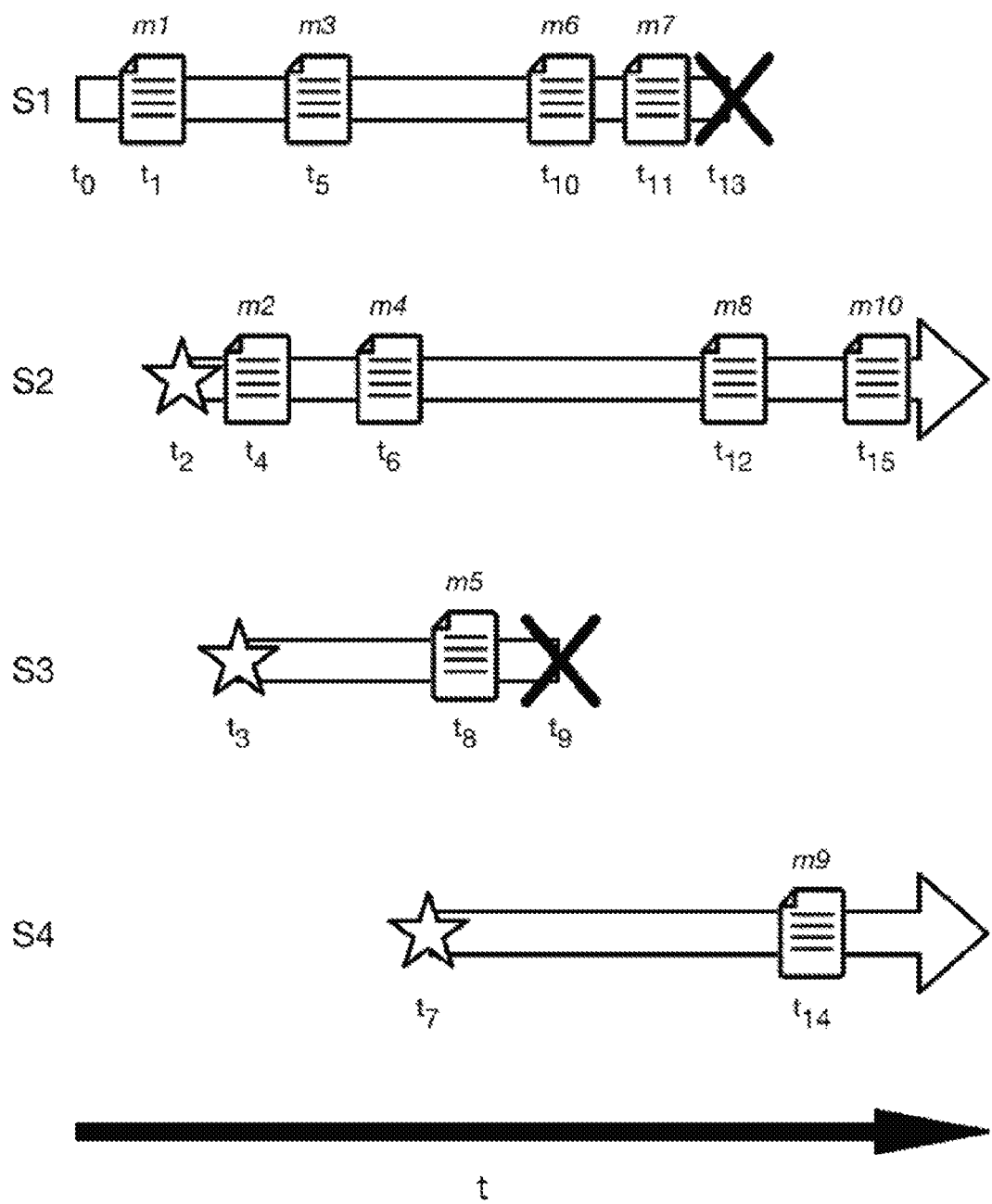
FIG. 5 shows a graph illustrating methods according to at least one aspect of the invention, with regard to a case in which a plurality of different sequences is used (i.e., N>1)

FIG. 5 is a schematic timing chart to fundamentally illustrate the methods according to the invention based on the first and second aspects. It shows N=4 exemplary radio identifier sequences S1 to S4, and the assignment of various radio signals $m_1$ to $m_{10}$ to be transmitted, for example in the form of messages for communicating measurement results captured by sensor, to these sequences. At the beginning, at the time $t_0$, only the first sequence S1 is active, while the other sequences S2 to S4 are either not initialized at all or else deactivated. A first radio signal $m_1$ to be transmitted can therefore only resort to the sequence S1, and is accordingly provided with a first radio identifier from this sequence S1. At the respective subsequent times $t_2$ and $t_3$, the second sequence S2 and the third sequence S3, respectively, are initialized or else, if this has already occurred beforehand, activated. A further radio signal, in particular also from the same transmitter, can then be transmitted on the basis of a selection rule, which selects among the available sequences the one that is to be used, also—as depicted—by means of a radio identifier from the sequence S2 (or S3) (time $t_4$). The sequence S1 continues to remain active, so that a further radio signal can be provided with the next radio identifier updated using the associated update scheme of the sequence S1 again (time $t_5$) on the basis of the selection rule. For the next radio signal that is to be transmitted at the time $t_6$, there fundamentally continue to be the sequences S1 to S3 available, from which one sequence is selected using the selection rule. In the example depicted, this is again the sequence S2, so that the radio signal $m_4$ is provided with a radio identifier from the sequence S2.

At the subsequent time $t_7$, the sequence S4 is also initialized or activated, so that all four sequences S1 to S4 are now fundamentally available for radio signals that are to be transmitted, subject to the selection rule. As such, for example the radio signal $m_5$ to be transmitted at the subsequent time $t_8$ can be assigned to the sequence S3 using the selection rule and can obtain its radio identifier from said sequence. At the time $t_9$, the sequence S3 is deactivated or even deleted, on the other hand, so that it is subsequently at least temporarily (in the case of mere deactivation) no longer available. Therefore, fundamentally only the sequences S1, S2 and S4 are available for transmitting the subsequent radio signals $m_6$, $m_7$ and $m_8$ (times $t_{10}$, $t_{11}$, $t_{12}$). In the example depicted, the respectively usable selection rule respectively selects a radio identifier from the first sequence S1 for $m_6$ and $m_7$ and a radio identifier from the sequence S2 for $m_8$. At the subsequent time $t_{13}$, the first sequence S1 is deleted or deactivated, so that it is no longer available for transmitting the further radio signals $m_9$ and $m_{10}$ depicted in FIG. 2. Instead, only the sequences S2 and S4 are now available for these radio signals. The respective selection rule is used to assign the radio signal m9, which is to be transmitted at the time $t_{14}$, to the sequence S4, which radio signal contains its radio identifier from said sequence, whereas this is the sequence S2 for the further radio signal $m_{10}$ that is to be transmitted at the time $t_{15}$.

In the simplest case, all of the radio signals $m_1$ to $m_{10}$ are associated with the same transmitter/receiver pair. In other, more complex, cases, however, multiple transmitter/receiver pairs are involved that provide their radio signals with radio identifiers from a plurality of the sequences S1 to S4. In particular, it is also possible for a subset of the total available sequences to be defined at least for one, preferably for each, transmitter/receiver pair, so that only sequences from this subset are used to provide applicable radio identifiers for this transmitter/receiver pair.

At the receiver, the sequences S1 to S4 are used in equal measure to generate the radio identifiers that are to be compared against the received radio signals for the purpose of identifying the respective transmitter.

Accordingly, in the embodiments depicted in FIG. 5, the varying of the transmission power and/or transmission frequency shown in FIG. 2 or FIG. 3 can be referenced in particular to each of the sequences in the set M={S1, . . . , S4} individually, or else by and large over all sequences or else only over a subset of the set M of sequences.

Referring to the flowchart depicted in FIGS. 6A-6C, an exemplary embodiment of the transmitter-end method according to the first aspect of the invention is described in more detail below. The left-hand half of each of the figures shows the method sequence generically, while the same method is illustrated in parallel on the right-hand side of each of the figures on the basis of concrete examples.

The method first has an initialization phase comprising steps 101 to 108 depicted in the flowchart. In step 101, a maximum number Nmax (where Nmax is a natural number, i.e. Nmax∈ℕ) of simultaneously available sequences is defined, as Nmax:=6 in the example shown. In addition, a counter n is initialized, as n:=0 in the example. The number N of sequences to be initialized during the initialization phase can then be set equal to Nmax in particular, or, as in the example shown, stipulated on a pseudorandom-controlled basis by taking into consideration the maximum number of sequences defined by Nmax and a minimum number of two sequences. The function RAND(Nmax) supposed to represent a pseudorandom function of this kind in this instance, which outputs a value between 1 and Nmax. Naturally, other ways of stipulating the number N of sequences are also conceivable.

In the subsequent step 102, the counter n is incremented and in step 103 a check is performed to determine whether still further sequences need to be initialized. If this is not the case (103—yes), the process branches directly to step 107 described later on. Otherwise (103—no), an initial value x[n; 0] is generated in step 104 for the current sequence corresponding to the counter reading of n as a secret number for this sequence, the initial value being generated either on a nondeterministically random basis or else, as depicted in this instance, pseudorandomly. The freely selectable parameter xmax in this instance represents a boundary for the range of values in which the initial value is pseudorandomly generated. This can be accomplished in particular by using a known method for nondeterministically generating random numbers on the basis of physical effects, such as for example pulse variations in electronic circuits (e.g. thermal noise in a resistor) or the like. In step 105, which in particular can also coincide with step 104, further authorization information is stipulated for the sequence. This is in particular the generation rule for a sequence of radio identifiers y[n;i], where i=1, 2, . . . , which specifies a hash function $f_n$ and a derivation function $g_n$ applicable to the output values thereof, and also an update scheme and the initial time $t_n$[0] thereof that serves as a time reference. In the present example, the update scheme consists in the respective next radio identifier in the sequence being chosen as current radio identifier periodically at constant intervals of time, e.g. $dt_n$=10 s.

Figure 6A:
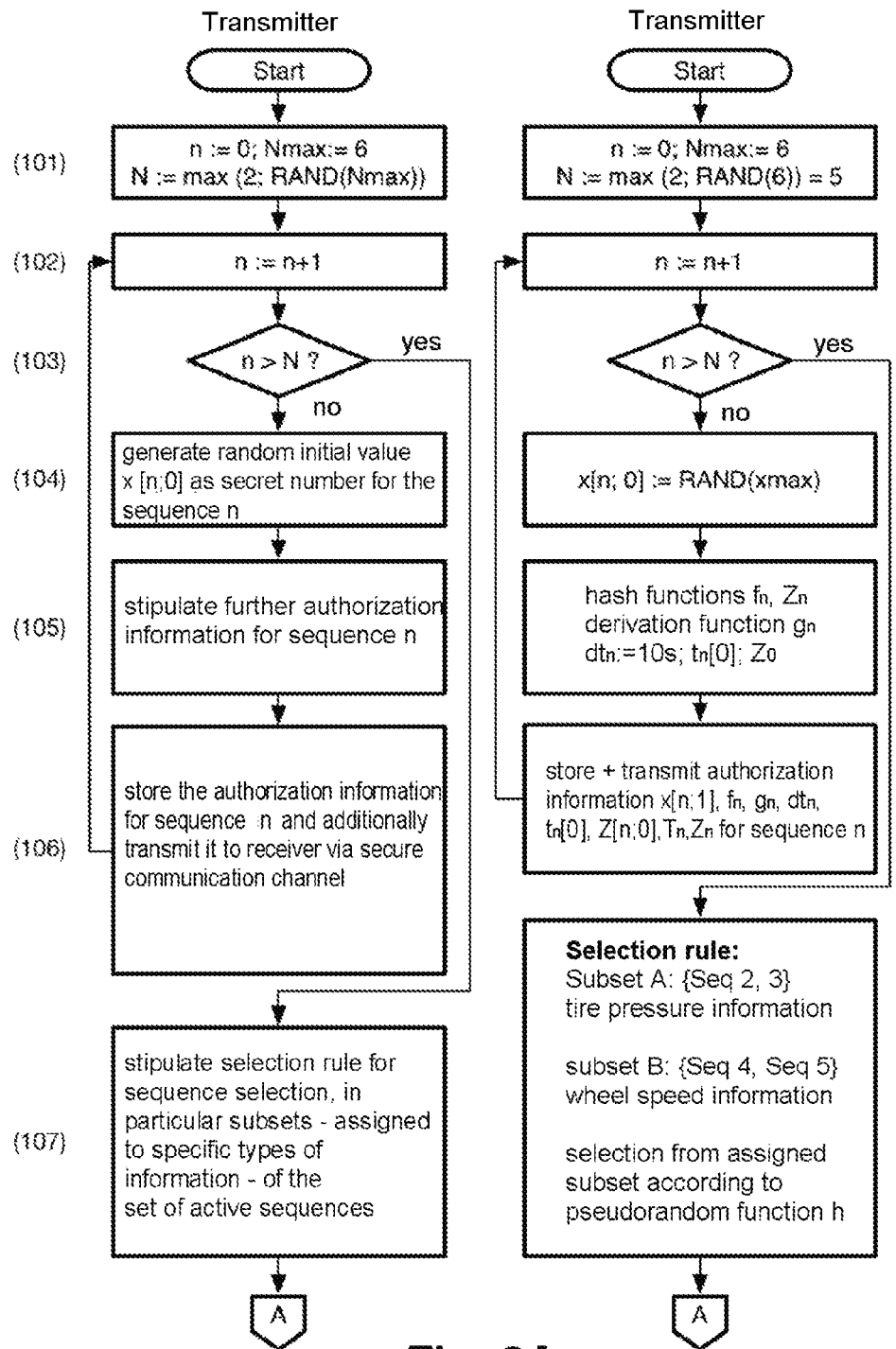
FIGS. 6A-6C show an exemplary embodiment of the transmitter-end method according to the first aspect of the invention.
Figure 6B:
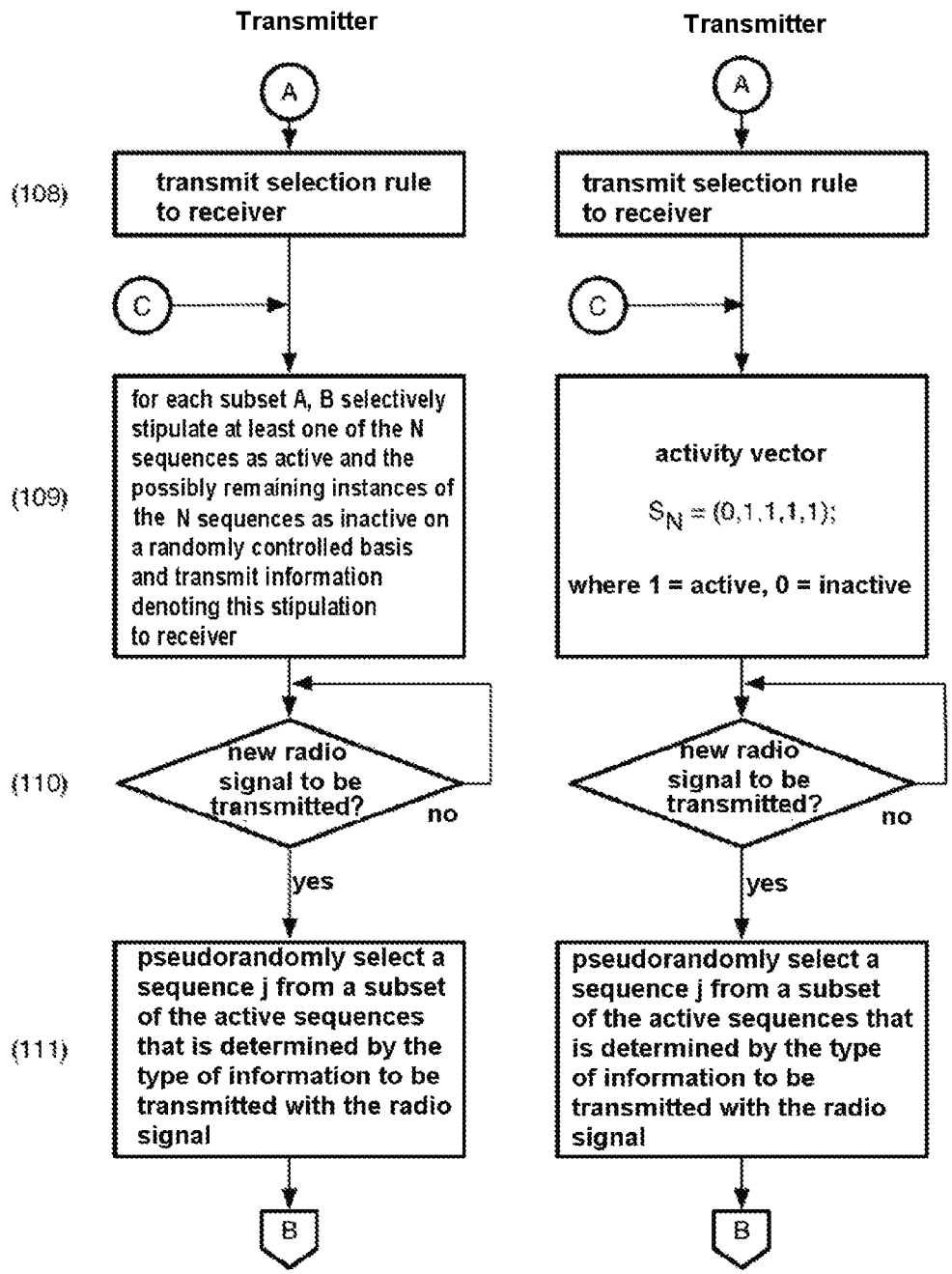

Additionally, the authorization information can optionally—as shown in FIG. 6A—contain variation information that allows the receiver end to trace a transmitter-end varying of the transmission power (and hence accordingly of the correlative signal strength measured at the receiver) and/or of the transmission frequency of the successively transmitted radio signals, and to dynamically configure the receiver as appropriate with regard thereto. This variation information therefore defines a deterministic variation scheme, according to which the transmission power and/or the transmission frequency (or correlative variables) can be determined for a next radio signal that is to be transmitted. The variation scheme for the transmission power and/or the transmission frequency may in particular each be defined by means of an associated trend function $T_n$ and an associated random function $Z_n$ along with associated initial value Z[n;0], as described above. Alternatively (not shown), however, it is possible for the variation information not to be transmitted if the receiver is capable of correctly processing the received signal strength and reception frequency varying in accordance with the transmitter-end varying of the transmission power and transmission frequency without this requiring appropriate configuration for the varying. This normally presupposes that the transmitter-end varying of the transmission power and the transmission frequency remains restricted to specific power and frequency ranges that are within the framework of the applicable radio specification of the receiver.

In step 106, this authorization information is transmitted to the receiver via a secure communication channel and also stored at the transmitter. The process then returns to step 102.

If the initialization loop is left in step 103 (103—yes), a selection rule for sequence selection is also stipulated in subsequent step 107. This can involve, as in the present example, determining subsets, in particular assigned to specific types of information, of the total set of active sequences. In the example, for example a first subset A has been defined that has the sequences 2 and 3 and is intended specifically for tire pressure information from a specific vehicle wheel. A further subset B, which has the sequences 4 and 5, is assigned for information relating to the wheel speed of the same vehicle wheel, on the other hand. Moreover, a pseudorandom function h is defined that is used to select one specific sequence within a subset, when there are multiple active sequences present therein, as a source of a radio identifier for the next radio signal that is to be transmitted. In step 108, the selection rule is likewise sent to the receiver via the secure communication channel. In particular in connection with radio communication between functional components within a vehicle 1, steps 101 to 108 and the associated steps of receiving the information transmitted in the process at the receiver end can already take place in the factory as part of an initialization procedure.

The operative phase that follows the initialization phase begins with a step 109, in which, in the present example, in order to vary the number of sequences active in each case, said sequences are activated or deactivated on a selectively (deterministically or nondeterministically) random-controlled basis. So that there is always the assurance that any radio signals to be transmitted can always obtain a current radio identifier from an active sequence assigned to the type of information conveyed with said radio signals, the activation or deactivation takes place on the proviso that, for each subset A, B, at least one of the sequences contained therein must always be active. The current stipulation of which the sequences are currently activated or deactivated is likewise conveyed to the receiver (e.g. as logon or logoff information for the sequences), which can be accomplished on the basis of an activity vector $S_N$, for example, as depicted on the right-hand side of FIG. 3B for the step 109, which, for each sequence, contains a value, e.g. a bit, indicating whether the associated sequence is currently active or inactive.

The method is therefore then ready to transmit a new radio signal. Whether such a signal is available is checked in step 110. If this is the case (110—yes), a sequence j is pseudo-randomly selected (by means of the function h) in step 111 from a subset A or B of the active sequences that is determined by the type of information to be transmitted with the radio signal. Otherwise (110—no), the check in step 110 is repeated until a new radio signal to be transmitted is available or termination of the method is requested (not depicted).

A check is also performed in step 112 for the selected sequence j in order to determine whether the assigned period of time $dt_j$ has elapsed and therefore a fresh update is pending. The period of time may be implemented by means of a counter, for example, which counts up to a threshold value that corresponds to the period of time (corresponding backward counting in the sense of a countdown is naturally also conceivable), then triggers an output signalling that the period of time has elapsed, and immediately afterwards begins the next counting. In addition to or independently of such circulating counting, it is also possible for the applicable check to be performed just on the basis of knowledge of the initial value $t_j[0]$ and the period of time $dt_j$. If the current period of time $dt_j$ has not yet elapsed on the basis of the check in step 112, which means that there is not yet a need for update (112—no), the method skips directly to step 116, in which the radio signal with the current radio identifier y[j;i] from the sequence j is transmitted to the assigned receiver. Otherwise (112—yes), the next iteration i:=i+1 is triggered for the sequence j using its update scheme.

For update purposes, the hash function $f_j$ specified in the update information is applied to the last secret number x[j;i−1] in step 114 in order to obtain a new output value, i.e. a new secret number x[j;i]=f(x[j;i−1]). This new secret number is used firstly as input value for the next iteration, and secondly as input value for the derivation function $g_j$, which derives the radio identifier y[j;i] for the currently running iteration from the secret number x[j;i] in step 115. In the example, the derivation is obtained by virtue of digits 4 to 6 in the secret number being filtered out and forming the respective new radio identifier y[j;i]. For the first iteration, in the example shown in FIG. 3C, this is the radio identifier:

$$Y[j;1]=g_j(f(x[j;0]))=g_j(f_j(25360256))=g_j(82219463295)=419.$$

Since only a portion of the generated secret number x[j;i] is therefore transferred to the radio identifier y[j;i], the derivation function $g_j$ has an information-reducing effect, since the secret number x[j;i] cannot be reconstructed definitely from the radio identifier y[j;i] derived therefrom, which means that additional security against unauthorized tracking is provided in this instance.

Figure 6C:
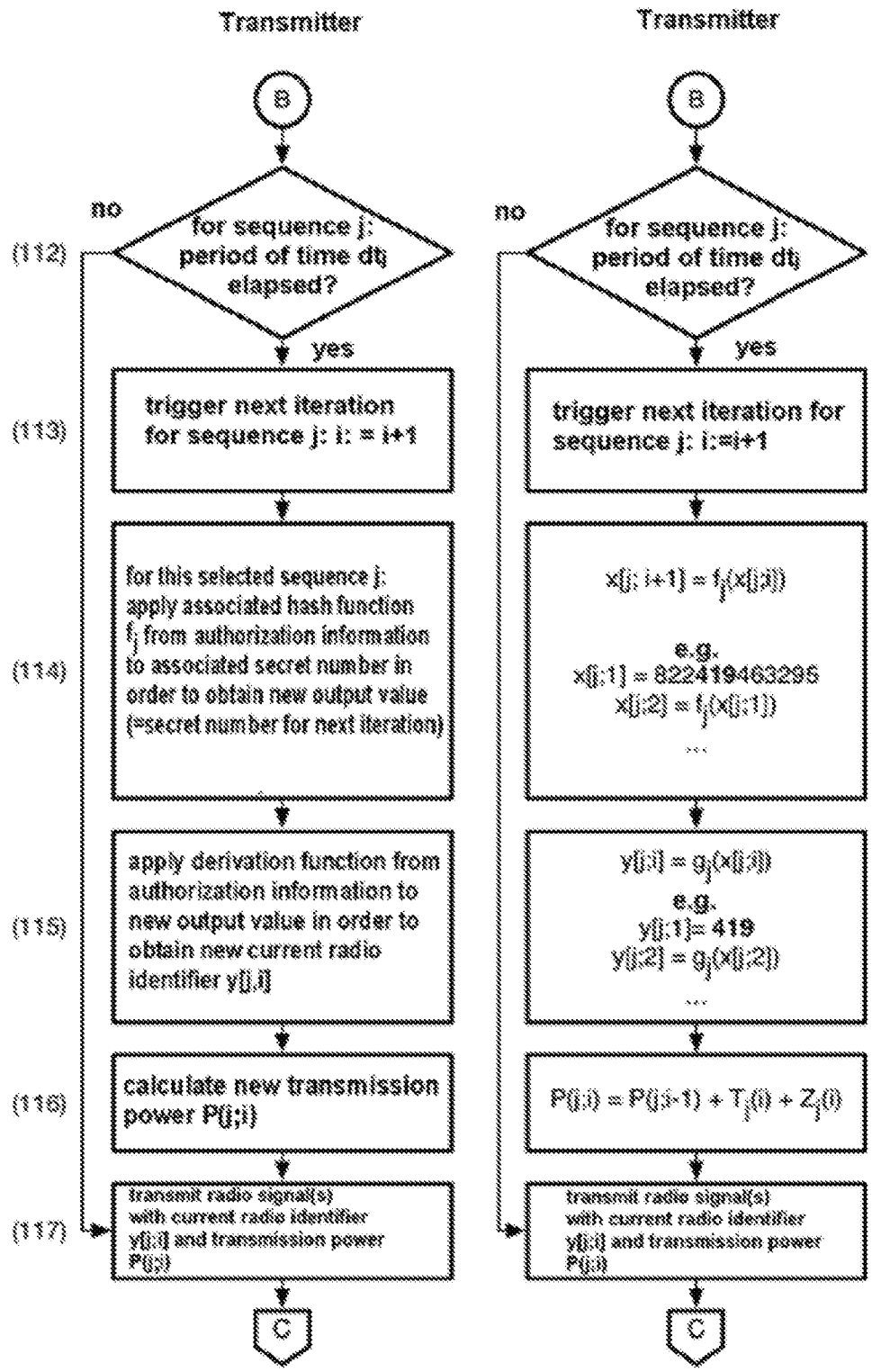

In a further step 116, a transmission power P(j;i) for the current iteration i is calculated, which is effected in sequence-based fashion and, in particular, as depicted in the right-hand example pertaining to step 116 in FIG. 6C, by means of the applicable function values of the trend function $T_j(i)$ and the random function $Z_j(i)$ for the current iteration and on the basis of the transmission power P(j;i−1) of the preceding iteration.

In step 117, the radio signal, optionally also multiple radio signals, is finally transmitted with the current radio identifier y[j;i] and the transmission power P(j;i) determined in step 116 to the associated receiver. The method then branches back to step 109 for a fresh pass.

Figure 7:
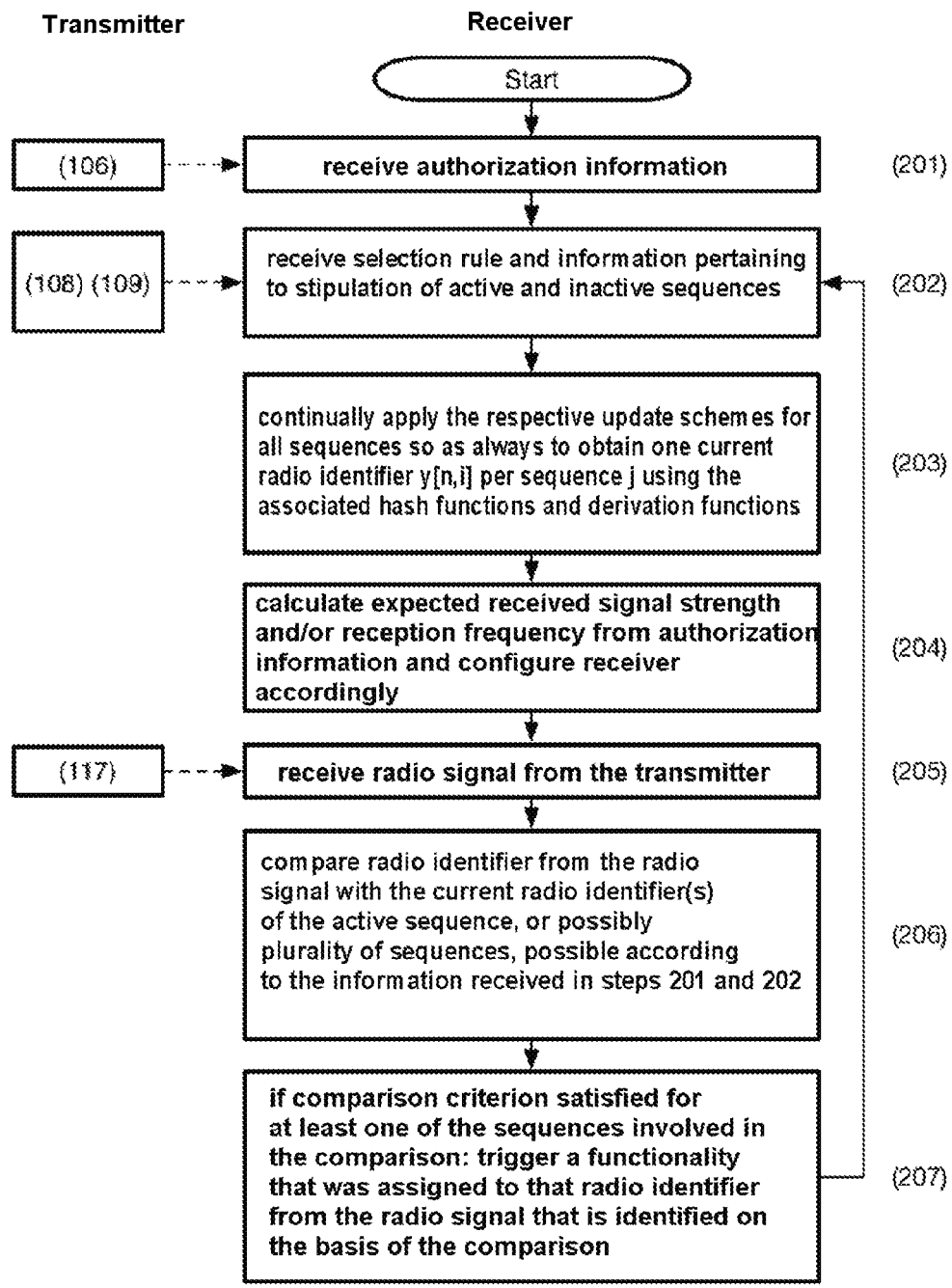
FIG. 7 shows an exemplary embodiment of a receiver-end method according to at least one aspect of the invention.

FIG. 7 illustrates an embodiment of the applicable receiver lateral method according to the second aspect of the invention in interaction with the transmitter-end method already described above.

In a step 201, the authorization information transmitted by the transmitter in step 106 is received. In a further step 202, the information pertaining to the selection rule and pertaining to the stipulation of active and inactive sequences that is conveyed by the transmitter in steps 108 and 109 is also received. Steps 201 and 202 can naturally also coincide—on the basis of the times at which the applicable transmission steps 106, 108, 109 respectively take place.

At the receiver, the respective update schemes are applied continually in step 203, so as always to obtain a current radio identifier y[n;i] for each of the defined N sequences by using the associated hash functions and derivation functions in the same way as described at the transmitter in steps 113 to 115. For each sequence n, the receiver can infer from the update scheme and knowledge of the initial time $t_n[0]$ which iteration is current at the transmitter right now, i.e. which radio identifier of the sequence the transmitter might use to transmit at present.

In a further step 204, an expected received signal strength is calculated from the authorization information Z[n;0], $T_n, Z_n$ received in step 201 beforehand and the receiver is configured as appropriate in order to ensure optimum reception of the next radio signal.

In a step 205 a radio signal that was transmitted by the transmitter in step 117 is then received and in a step 206 the radio identifier is extracted from the radio signal and compared with the current radio identifier or the current radio identifiers of the active sequence, or possibly plurality of active sequences, possible according to the information received in steps 201 and 202 using a predefined comparison criterion. The comparison criterion can in particular involve checking whether the two compared radio identifiers are concordant. If the comparison criterion is satisfied, an appropriate assigned functionality is triggered at the receiver in step 207, as already described in exemplary fashion above in connection with FIG. 1.

Even if not explicitly depicted in FIGS. 6 to 6C and 7, the method in respect of optional varying of the transmission frequency can take place in accordance with the varying of the transmission power, but in particular the transmission frequency can be provided independently of the variation of the transmission power.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

Moreover, various elements described herein generally include hardware and/or software/firmware, including but not limited to: processors, memories, input/output interfaces, operating systems and network interfaces, configured to effectuate the functionalities described herein. When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation. Thus, while at least one embodiment has been described above, it should be noted that a large number of variations therefor exist. It should also be borne in mind that the exemplary embodiments described are only nonlimiting examples, and it is not the intention to thereby restrict the scope, the applicability or the configuration of the apparatuses and methods described herein. Rather, the above description will provide a person skilled in the art with instructions for implementing at least one exemplary embodiment, it being understood that various changes in the function and the arrangement of the elements described in one exemplary embodiment may be made without thereby deviating from the subject matter respectively defined in the appended claims and its legal equivalents.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

LIST OF REFERENCE SIGNS 1 vehicle (motor vehicle)
2 tire sensor
3 mobile radio apparatus (for example smartphone)
4 locking system
5 control unit
5a processing unit
5b communication unit
6 gateway
S1, . . . , SN radio identifier sequences (sequences)

The invention claimed is:

1. A method for transmitting radio identifiers via a mobile radio apparatus, the method comprising:
repeatedly transmitting radio signals via a transmitter, wherein each radio signal carries a respective radio identifier identifying the mobile radio apparatus;
selecting the respective radio identifiers dynamically from a set of $N \in \mathbb{N}$ predefined sequences of radio identifiers, wherein each of the predefined sequences are pseudo-random and unique within the set, and wherein the selection of the respective radio identifiers includes: (a) selecting a sequence from the set according to a predetermined selection rule, such that: if $N=1$ such that the set is a single sequence, the predetermined selection rule selects the single sequence as the sequence, and if $N>1$ such that the set is a plurality of predefined sequences, the predetermined selection rule selects the sequence from among the plurality of predefined sequences, and (b) selecting the respective radio identifier from the sequence using a predetermined deterministic update scheme assigned to the sequence,
wherein the repeated transmission of the radio signals includes using a predetermined deterministic variation scheme to dynamically vary the transmission power and/or the transmission frequency for a current radio signal from the transmission power and the transmission frequency of an immediately preceding radio signal.

2. The method of claim 1,
wherein the predetermined deterministic variation scheme is used to vary the transmission power for successive radio signals by combining a first variation with a second variation,
wherein the first variation is defined via a trend function, defined for the sequence, that in turn stipulates a systematic variation of the transmission power for the sequence,
wherein the systematic variation is defined over at least three successive radio signals and has a monotonously rising or falling characteristic, and
wherein the second variation is effected for each radio signal affected by the varying and is pseudorandomly controlled in a deterministic manner.

3. The method of claim 2, wherein the predetermined deterministic variation scheme is used to determine the transmission power for a next radio signal affected by the varying, starting from a transmission power stipulated for a preceding radio signal affected by the varying, by adding a function value, obtained for the next radio signal, of the trend function according to the first variation and a pseudo-randomly generated random number according to the second variation.

4. The method of claim 1, wherein, if $N>1$, then the predetermined deterministic variation scheme varies the transmission power and/or transmission frequency in a sequence-based fashion, whereby, for successive radio signals that carry respective radio identifiers from a specific sequence, the transmission power and/or transmission frequency of the successive radio signals is varied independent of any other of the predefined sequences.

5. The method of claim 4, wherein, according to the predetermined deterministic variation scheme, the transmission power and the transmission frequency of the successive radio signals that carry the respective radio identifier from the specific sequence is at least sometimes pseudorandomly controlled in a deterministic manner.

6. The method according to 5, wherein, according to the predetermined deterministic variation scheme, the transmission power of at least two of the N>1 predefined sequences is varied via respective individual trend functions assigned to the at least two predefined sequences, wherein at least two of the trend functions have no correlation between them.

7. The method of claim 1,
wherein the predetermined deterministic variation scheme is used to vary the transmission power for successive radio signals by combining a first variation with a second variation,
wherein the first variation is defined via a trend function, defined for the sequence, that in turn stipulates a systematic variation of the transmission power for the sequence,
wherein the systematic variation is defined over at least three successive radio signals and has a monotonously rising or falling characteristic, and
wherein the second variation is effected for each radio signal affected by the varying and is pseudorandomly controlled in a deterministic manner,
wherein, if N>1, then the predetermined deterministic variation scheme varies the transmission power and/or transmission frequency in a sequence-based fashion, whereby, for successive radio signals that carry respective radio identifiers from a specific sequence, the transmission power and/or transmission frequency of the successive radio signals is varied independent of any other of the predefined sequences, and
wherein according to the predetermined deterministic variation scheme, the transmission power of at least two of the N>1 predefined sequences is varied via respective individual trend functions assigned to the at least two predefined sequences, wherein at least two of the trend functions have no correlation between them.

8. The method of claim 1,
wherein the predetermined deterministic variation scheme is used to determine the transmission power for a next radio signal affected by the varying, starting from a transmission power stipulated for a preceding radio signal affected by the varying, by adding a function value, obtained for the next radio signal, of the trend function according to the first variation and a pseudorandomly generated random number according to the second variation,
wherein if N>1 then the predetermined deterministic variation scheme varies the transmission power and/or transmission frequency in a sequence-based fashion whereby, for successive radio signals that carry respective radio identifiers from a specific sequence, the transmission power and/or transmission frequency of the successive radio signals is varied independent of any other of the predefined sequences, and
wherein, according to the predetermined deterministic variation scheme, the transmission power of at least two of the N>1 predefined sequences is varied via respective individual trend functions assigned to the at least two predefined sequences, wherein at least two of the trend functions have no correlation between them.

9. The method of claim 1, wherein the number N of predefined sequences is dynamically varied for the selection of the respective radio identifier for a next radio signal.

10. The method of claim 9, wherein the number N of predefined sequences is dynamically varied by means of one or more of the following measures:
adding one or more new predefined sequences to the set;
deleting one or more of the predefined sequences from the set; and
at least temporarily activating or deactivating one or more of the predefined sequences, so that only the predefined sequences that are currently active are selectable using the selection rule, while the predefined sequences that are deactivated are not selectable using the selection rule until reactivation.

11. The method of claim 10, wherein:
adding one or more new predefined sequences to the set includes generating a new predefined sequence such that the transmission power and/or the transmission frequency of the radio signals having radio identifiers selected from the new predefined sequence initially rises monotonously for at least three immediately successive radio signals; and/or
deleting one or more of the predefined sequences from the set is such that, prior to the deletion, the transmission power and/or the transmission frequency of the radio signals having radio identifiers selected from the one or more predefined sequences initially falls monotonously for at least three immediately successive radio signals.

12. The method of claim 1, wherein the current radio signal is selected to additionally carry information indicating the occurrence of a transmission error, independently of an actual occurrence of the transmission error, in a preceding radio signal.

13. A method for identifying a mobile radio apparatus via a receiving apparatus, the method comprising:
receiving a radio signal that carries a radio identifier identifying a module radio apparatus that transmitted the radio signal, wherein receiving the radio signal includes:
dynamically configuring an expected received signal strength and/or a reception frequency for receiving the radio signal using a corresponding deterministic variation scheme that corresponds to and is synchronized to a deterministic variation scheme used by the mobile radio apparatus in transmitting the radio signal;
comparing the radio identifier with a reference radio identifier selected from a predefined sequence of reference radio identifiers according to a predetermined deterministic update scheme assigned to the predefined sequence, wherein the predefined sequence is selected from a set of predefined sequences according to a predetermined selection rule, such that:
(a) if the set is a single sequence, the single sequence is selected as the predefined sequence; and
(b) if the set is a plurality of predefined sequences, the predetermined selection rule selects the predefined sequence from among the plurality of predefined sequences; and
triggering a predetermined functionality on the receiving apparatus only if the comparison reveals that the radio identifier is concordant with the reference radio identifier according to a predetermined comparison criterion.

14. A mobile radio apparatus, having:
a communication unit for radio communication with a remote station; and
a processing unit configured to cause the mobile radio apparatus to carry out a method for transmitting radio identifiers, the method comprising:
repeatedly transmitting radio signals via a transmitter, wherein each radio signal carries a respective radio identifier identifying the mobile radio apparatus;
selecting the respective radio identifiers dynamically from a set of N∈ℕ predefined sequences of radio identifiers, wherein each of the predefined sequences are pseudorandom and unique within the set, and wherein the selection of the respective radio identifiers includes: (a) selecting a sequence from the set according to a predetermined selection rule, such that: if N=1 such that the set is a single sequence, the predetermined selection rule selects the single sequence as the sequence, and if N>1 such that the set is a plurality of predefined sequences, the predetermined selection rule selects the sequence from among the plurality of predefined sequences, and (b) selecting the respective radio identifier from the sequence using a predetermined deterministic update scheme assigned to the sequence,
wherein the repeated transmission of the radio signals includes using a predetermined deterministic variation scheme to dynamically vary the transmission power and/or the transmission frequency for a current radio signal from the transmission power and the transmission frequency of an immediately preceding radio signal.

15. A system for transmitting and identifying radio identifiers, comprising:
a mobile radio apparatus having a communication unit for radio communication with a remote station, and a processor configured to cause the mobile radio apparatus to carry out a method for transmitting radio identifiers, the method comprising:
repeatedly transmitting radio signals via a transmitter, wherein each radio signal carries a respective radio identifier identifying the mobile radio apparatus;
selecting the respective radio identifiers dynamically from a set of N∈ℕ predefined sequences of radio identifiers, wherein each of the predefined sequences are pseudorandom and unique within the set, and wherein the selection of the respective radio identifiers includes: (a) selecting a sequence from the set according to a predetermined selection rule, such that: if N=1 such that the set is a single sequence, the predetermined selection rule selects the single sequence as the sequence, and if N>1 such that the set is a plurality of predefined sequences, the predetermined selection rule selects the sequence from among the plurality of predefined sequences, and (b) selecting the respective radio identifier from the sequence using a predetermined deterministic update scheme assigned to the sequence,
wherein the repeated transmission of the radio signals includes using a predetermined deterministic variation scheme to dynamically vary the transmission power and/or the transmission frequency for a current radio signal from the transmission power and the transmission frequency of an immediately preceding radio signal; and
at least one receiving apparatus configured to carry out a method for identifying the mobile radio apparatus, the method comprising:
receiving a radio signal of the radio signals transmitted by the mobile radio apparatus, wherein the radio signal carries a radio identifier, and wherein receiving the radio signal includes: dynamically configuring an expected received signal strength and/or a reception frequency for receiving the radio signal using a corresponding deterministic variation scheme that corresponds to and is synchronized to the deterministic variation scheme used by the mobile radio apparatus in transmitting the radio signal;
comparing the radio identifier with a reference radio identifier selected from a predefined sequence of reference radio identifiers according to the predetermined deterministic update scheme assigned to the predefined sequence, wherein the predefined sequence is selected from a set of predefined sequences according to the predetermined selection rule, such that: (a) if the set is a single sequence, the single sequence is selected as the predefined sequence; and (b) if the set is a plurality of predefined sequences, the predetermined selection rule selects the predefined sequence from among the plurality of predefined sequences; and
triggering a predetermined functionality on the receiving apparatus only if the comparison reveals that the radio identifier is concordant with the reference radio identifier according to a predetermined comparison criterion.

16. The system according to claim 15, wherein:
the receiving apparatus is further configured to carry out the method for transmitting radio identifiers; and
the varying of the transmission power and/or transmission frequency of radio signals transmitted by the mobile radio apparatus is effected in the same way as and in synchronization with the varying of the transmission power and/or transmission frequency of radio signals transmitted by the receiving apparatus in carrying out the method for transmitting radio identifiers.

17. A motor vehicle, comprising:
a mobile radio apparatus having:
a communication unit for radio communication with a remote station; and
a processing unit configured to cause the mobile radio apparatus to carry out a method for transmitting radio identifiers, the method comprising:
repeatedly transmitting radio signals via a transmitter, wherein each radio signal carries a respective radio identifier identifying the mobile radio apparatus;
selecting the respective radio identifiers dynamically from a set of N∈ℕ predefined sequences of radio identifiers, wherein each of the predefined sequences are pseudorandom and unique within the set, and wherein the selection of the respective radio identifiers includes: (a) selecting a sequence from the set according to a predetermined selection rule, such that: if N=1 such that the set is a single sequence, the predetermined selection rule selects the single sequence as the sequence, and if N>1 such that the set is a plurality of predefined sequences, the predetermined selection rule selects the sequence from among the plurality of predefined sequences, and (b) selecting the respective radio identifier from the sequence using a predetermined deterministic update scheme assigned to the sequence,
wherein the repeated transmission of the radio signals includes using a predetermined deterministic variation scheme to dynamically vary the transmission power and/o the transmission frequency for a current radio signal from the transmission power and the transmission frequency of an immediately preceding radio signal.

* * * * *